(12) United States Patent
Contessa et al.

(10) Patent No.: US 10,598,274 B2
(45) Date of Patent: Mar. 24, 2020

(54) MODULAR CONTROL DEVICE FOR A VEHICLE GEARBOX

(71) Applicant: FCA Italy S.p.A., Turin (IT)

(72) Inventors: Francesco Contessa, Turin (IT); Dario Luvison, Turin (IT); Valter Maggiora, Turin (IT); Paolo Mancin, Turin (IT); Vincenzo Nuara, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 16/162,602

(22) Filed: Oct. 17, 2018

(65) Prior Publication Data

US 2019/0186625 A1    Jun. 20, 2019

(30) Foreign Application Priority Data

Dec. 20, 2017   (EP) ..................................... 17208866

(51) Int. Cl.
*F16H 59/02*     (2006.01)
*F16H 59/10*     (2006.01)
*F16H 61/36*     (2006.01)

(52) U.S. Cl.
CPC ......... *F16H 59/0204* (2013.01); *F16H 59/02* (2013.01); *F16H 59/0278* (2013.01); *F16H 59/10* (2013.01); *F16H 61/36* (2013.01); *F16H 2059/026* (2013.01)

(58) Field of Classification Search
CPC . F16H 61/36; F16H 2059/026; F16H 59/0278
USPC ................................ 74/473.14, 502.4, 502.6
See application file for complete search history.

(56) References Cited

U.S. PATENT DOCUMENTS

| 5,144,853 A * | 9/1992 | Giudici ................. B60K 20/04 180/334 |
| 5,277,077 A * | 1/1994 | Osborn ................... F16H 59/10 29/401.1 |
| 10,047,852 B2 * | 8/2018 | Giefer ..................... F16H 59/02 |
| 2015/0276054 A1 * | 10/2015 | Oda ........................ F16H 61/36 74/473.15 |

(Continued)

FOREIGN PATENT DOCUMENTS

| DE | 102014210126 A1 | 12/2015 | |
| JP | 2003004135 A * | 1/2003 | ............. F16H 59/02 |
| JP | 2003004135 A | 1/2003 | |

OTHER PUBLICATIONS

European Search Report for EP 17 208 866.8 dated May 29, 2018. 3 pages.

*Primary Examiner* — William C Joyce
*Assistant Examiner* — Randell J Krug
(74) *Attorney, Agent, or Firm* — RMCK Law Group, PLC

(57) ABSTRACT

A control device for a vehicle gearbox includes a support casing and a control lever pivotally mounted about an oscillation axis within said support casing. A pivoting body is rotatably mounted within the support casing about the oscillation axis of the control lever and is connected in rotation with the control lever. A connecting member for a gearbox control cable is connected to the pivoting body by an adapter element. The adapter element and the pivoting body are configured so they can be coupled with each other in different relative positions, in order to create different positions and/or different orientations of the control cable with respect to the pivoting body.

6 Claims, 16 Drawing Sheets

(56) References Cited

U.S. PATENT DOCUMENTS

2016/0017984 A1* 1/2016 Puffpaff .............. F16H 59/0208
　　　　　　　　　　　　　　　　　　　　　74/473.29

* cited by examiner

MODULAR CONTROL DEVICE FOR A VEHICLE GEARBOX

CROSS-REFERENCE TO RELATED APPLICATION

This application claims priority to European Patent Application No. 17 208 866.8 filed Dec. 20, 2017. The disclosure of the above application is incorporated herein by reference in its entirety.

FIELD OF THE INVENTION

The present invention relates to a device for controlling a vehicle gearbox of the type comprising:
- a support casing,
- a control lever pivotally mounted about an oscillation axis within said support casing and having an upper portion projecting from the support casing and carrying a lever handle,
- a pivoting body rotatably mounted within said support casing about said oscillation axis and connected in rotation with said control lever about said oscillation axis, and
- a connecting member for a gearbox control cable, connected to said pivoting body
- wherein said connecting member (300) is connected to said pivoting body (W) by means of at least one adapter element (18), and
- wherein said adapter element (18) and said pivoting body (W) are configured so that they can be coupled with each other in different relative positions, so as to create different positions and/or different orientations of the control cable (B) with respect to the pivoting body (W).

A gearbox of this type is known from JP 2003 004135 A.

The invention generally refers to any type of gearbox and, therefore, also to mechanically-controlled gearboxes. However, a particularly preferred application of the invention is that intended for automatic gearboxes and robotized or electro-actuated gearboxes.

PRIOR ART

FIG. 1A of the attached drawings schematically shows the configuration of a device for controlling a vehicle gearbox according to the prior art. The control device of FIG. 1A, generally designated by reference 1, comprises a lever 2, provided with a handle 2A and covered by a protection cap 2B. The lever 2 is pivotally mounted within a casing 3 mounted above a supporting structure 4. In the case illustrated in FIG. 1A, the supporting structure 4 is in the form of a plate screwed to the longitudinal central tunnel-like portion (not illustrated) of the vehicle floor panel. An oscillating movement of the lever 2 causes a corresponding translation of a flexible metal cable B, which has an end operatively connected to the lever 2, and the opposite end operatively connected to a lever L for actuating the gearbox. The metal cable B is guided within a sheath B1 having one end connected to the supporting structure 4, and the opposite end connected to a bracket 5, fixed to the vehicle gearbox structure. FIG. 1A does not show the gearbox of the vehicle, which can, however, be of any known type. As already indicated, the present invention is particularly directed at applications such as those of automatic gearboxes, robotized gearboxes or electro-actuated gearboxes. In the case, for example, of an automatic gearbox, the control lever 2 has at least four operating positions identified, according to the prior art, by the letters "P", "R", "N", "D" and corresponding, respectively, to the conditions of parking, reverse gear, neutral and drive gear. In gearboxes of this type, the flexible cable B transforms the four different positions of the control lever 2 into four different positions of the operating lever L. In many gearboxes of this type, there is also a "sequential" mode, which allows the driver to manually engage the different transmission positions in sequence, in the drive condition. This type of operation is not entrusted to the flexible cable B, but to an electronic control device, which operates the gearbox based on the signal received by a sensor of the movement of the control lever.

Instead, in gearboxes of the so-called robotized or electro-actuated type, which are substantially similar to conventional manually-operated gearboxes, but provided with actuators of the devices for engaging the various gears, the lever L for actuating the gearbox only has two operating positions, corresponding, respectively, to a "Parking" condition and a "no-Parking" condition. Therefore, the flexible cable B only transmits the movement of the control lever 2 to the operating lever L between the positions "P" and "no-P". In the "no-P" condition, the "R", "N", and "D" modes are used. These modes are always activated by a corresponding movement of the control lever 2, but in this case, activation is not obtained by the movement of the control cable B, but by electric actuators controlled by sensor devices configured for detecting the operating position of the lever 2. For example, as illustrated in FIG. 1B, the lower end of the lever 2 carries a tip 2C pushed by a spring 2D in engagement against a shaped track 2E having a plurality of seats defining, respectively, the positions "P", "R", "N" and "D". Finally, even in robotic gearboxes, the sequential mode is always carried out by an electronic control unit, without the intervention of the metal cable B.

Again, with reference to the prior art, FIGS. 2, 3 and 4 illustrate three different examples of configurations of currently known gearbox control devices. FIGS. 2, 3 regard solutions of the type in which the movement of the control lever 2 is guided within a shaped slot (so-called "Greek key") 2F formed in the upper wall of the casing 3. In the illustrated examples, the shaped conformation of the slot 2F implies that the transition of the control lever 2 from the "P" position to the "R" position takes place with a first transverse movement, followed by a longitudinal movement and then by a further transversal movement (the terms "transverse" and "longitudinal" are used, in the present description, with reference to the transverse and longitudinal directions of the vehicle). The transition from the position "R" to the position "N" takes place with a longitudinal movement and then with a transverse movement. The transition from the position "N" to the position "D" takes place simply with a longitudinal movement.

In the case of the solution of FIG. 2, once the control lever 2 has reached the "D" position, it can be moved transversely to the "Manual" position corresponding to the sequential mode, from which the actuating lever 2 can be moved towards the "+" position or towards the "−" position, respectively, to shift gear up or down. The control lever 2, in the "MANUAL" mode, is spring-biased to the central position after each actuation.

FIG. 3 is substantially similar to FIG. 2, except for a different arrangement of the control lever 2 in the "MANUAL" mode. In this case, the "MANUAL" position coincides with the "D" position. Starting from this position, the control lever 2 can be moved several times to the left or to the right, i.e. to the "−" position or to the "+" position to exit the automatic mode and activate the sequential mode.

FIG. 4 shows a "linear" solution, which has its four operating positions "P", "R", "N" and "D" arranged in series, one after the other, along the same longitudinal direction. From position "D", which in the case shown is the most rearward of the four operating positions, the control lever can be moved transversely to another stable position corresponding to the sequential or "MANUAL" mode. Once this position has been reached, the control lever 2 can be sequentially moved forwards or backwards, returning to the central position after each operation, to cause—each time—an increase or decrease in gear, similarly to that indicated with reference to FIG. 2.

Still with reference to the prior art, FIGS. 4A and 4B of the attached drawings show two examples of how the gearbox control device can be positioned on the vehicle. FIG. 4A shows a solution analogous to that of FIG. 1A, in which the casing 3 of the gearbox control device is rigidly connected, for example by screws, on a central longitudinal tunnel 6 that forms part of the vehicle floor. In this case, the flexible metal cable B and its sheath B1 are guided below the upper wall of the tunnel 6.

FIG. 4B illustrates a different solution, in which the support casing 3 of the gearbox control device 1 is rigidly connected to a supporting structure 7 of the dashboard, and is arranged so as to present the control lever 2 above the dashboard of the vehicle.

Of course, the two different positions of the control device illustrated in FIGS. 4A, 4B generally entail the arrangement of different structures of the control device, of different structures for supporting the control device and a different positioning and a different orientation of the actuating cable B with respect to the control device. In the case of the solution of FIG. 4A, the cable B exits the casing 3 according to a direction initially very inclined with respect to the vertical direction, and then substantially horizontal, below the tunnel 6, while in the case of the solution of FIG. 4B, the cable extends, in its initial portion in a direction slightly inclined with respect to the vertical.

Consequently, the vehicle manufacturer must generally design the control device according to its location on the vehicle.

OBJECT OF THE INVENTION

The object of the present invention is that of providing a modular gearbox control device, which is extremely flexible in use and that can be easily adapted to different mounting positions and orientations of the control device with respect to the vehicle structure.

A further object of the invention is to achieve the aforesaid objective with a device that is, in any case, efficient and reliable during operation.

Still another object of the invention is to provide a gearbox control device that is of simple construction and relatively inexpensive.

SUMMARY OF THE INVENTION

In view of achieving one or more of the aforesaid objects, the invention relates to a gearbox control device comprising:
a support casing,
a control lever pivotally mounted about an oscillation axis within said support casing and having an upper portion projecting from the support casing and carrying a lever handle,
a pivoting body rotatably mounted within said support casing about said oscillation axis and connected in rotation with said control lever about said oscillation axis,
a connecting member for a gearbox control cable, connected to said pivoting body,
wherein said connecting member is connected to said pivoting body by means of at least one adapter element,
wherein said adapter element and said pivoting body are configured so they can be coupled with each other in different relative positions, in order to create different positions and/or different orientations of said connecting member, and consequently of said control cable, with respect to said pivoting body and
wherein the pivoting body has a cylindrical wall, or a cylindrical wall portion, having an axis substantially coincident with said oscillation axis and having a plurality of seats circumferentially spaced apart and selectively engageable by said adapter element for selectively connecting said adapter element in different corresponding positions on said pivoting body.

As an alternative or in addition to the aforesaid solution, the aforesaid adapter element has a body including a first end portion received in a seat of the pivoting body, for connecting the adapter element to the pivoting body, and a second end portion, connected to said connecting member. The aforesaid first end portion and the aforesaid second end portion can be reversed in position with each other, so that the second end portion is received in the seat of the pivoting body and the first end portion is, instead, connected to the connecting member of the cable. Moreover, the first end portion and the second end portion of the adapter element are transversely displaced with respect to the longitudinal direction of said connecting element, which goes from the first end portion to the second end portion, so that the relative position of the connecting member of the control cable, with respect to the pivoting body, is different according to whether the first end portion or the second end portion of said adapter element is engaged in said seat.

Thanks to the aforesaid characteristics, the control device according to the invention can be configured by mounting the aforesaid connecting member in different positions and according to different orientations above the pivoting body that is actuated by the control lever. Consequently, the positions and orientations of the initial portion of the metal actuating cable extending from the control device are different.

As an alternative or in addition to the aforesaid solutions, the device according to the invention comprises a supporting container arranged outside the aforesaid casing and rigidly connected thereto by connection means arranged to allow selective mounting of the casing in different angular positions, about the aforesaid articulation axis, with respect to the aforesaid supporting container. The device is further provided with both a first assembly member, arranged to be interposed in the rigid connection between said outer container and a longitudinal central tunnel of a vehicle floor, and a second assembly member, configured to be interposed in a rigid connection between said outer container and a supporting structure of a vehicle dashboard.

DESCRIPTION OF THE INVENTION

Further characteristics and advantages of the invention will become apparent from the description that follows with reference to the attached drawings, provided purely by way of non-limiting example, wherein:

FIG. 1A is a schematic perspective view of a gearbox control device according to the prior art, FIG. 1B illustrates a cross-section of a detail of a gearbox control device according to the prior art, FIGS. 2-4 illustrate schematically the movements of the control lever of the gearbox according to three different known solutions, FIGS. 4A, 4B are a perspective view and a cross-sectional side view, respectively, showing two different mounting positions of a gearbox control device on a vehicle, FIGS. 5 and 6 are partially cross-sectioned side views that show an embodiment of the control device according to the invention in a condition mounted on the longitudinal central tunnel of a vehicle floor, and on a vehicle dashboard, respectively, FIG. 7 is an exploded perspective view of a preferred embodiment of a control device according to the invention, FIGS. 8-11 are perspective views of four different configurations of the control device according to the invention, and FIGS. 12-18 are perspective views of some components of the control device according to the invention in the mounted condition or in an exploded condition, which show the transformation of the control device from a first assembled condition to a second assembled condition, which differs from the first assembled condition in that it has a different position and a different orientation of the connecting member of the gearbox actuating cable.

FIGS. 1A, 1B, 2-4 and 4A, 4B—relative to the prior art—have already been described above. In the remaining FIGS. 5-17, the corresponding parts, at least from a functional point of view, to those illustrated in FIGS. 1A-4B, are indicated with the same references.

FIGS. 5, 6 show an embodiment of a device 1 for controlling a vehicle gearbox, respectively, in an arrangement prepared for mounting on the tunnel 6 of a vehicle, or on a structure 7 that supports a vehicle dashboard. FIGS. 5 and 6 show an outer container C, containing the components of the control device, which is rigidly connected to the tunnel 6 (FIG. 5) with the interposition of a first mounting member 8, while in the other type of installation (FIG. 6), the outer container C is rigidly connected to the supporting structure 7 of the dashboard, by interposing a second mounting member 9. Both members 8, 9 are more clearly visible in FIG. 7.

With reference to FIG. 7, the mounting member 8 comprises a plate 8A provided with holes for engaging fixing screws to the tunnel 6, and four flanges 8B projecting vertically from the plate 8A having holes for engaging fixing screws to the container C.

In the case of the example illustrated in FIG. 7, the container C consists of two container portions C1, C2 rigidly connected to each other by means of screws 10. FIGS. 5 and 6 also show the initial portion of the sheath B1 of the actuating cable B, which extends from the control device 1. As can be seen, the orientation of the sheath B1 (and consequently of the cable B) with respect to the casing C is completely different in the case illustrated in FIG. 5 with respect to the case illustrated in FIG. 6.

The mounting member 9 has a base portion 9A, having a U-shaped configuration, with holes for engaging the fixing screws to the supporting structure of the dashboard and flanges 9B projecting from the base portion 9A, having holes for engaging fixing screws of the container C.

Now with reference to FIG. 7, in the case of the illustrated example, the control device 1 can be set up with two different control levers 2 suitable, respectively, to a solution in which the movement of the lever is guided by a shaped slot 2F (as in the case of FIG. 2) and in the case of a "linear" solution of the type illustrated in FIG. 4. Corresponding to these two different solutions, the container C formed by the two container portions C1, C2 is completed by an upper wall, which can take the shape of the element indicated by 11A in FIG. 7, in the solution with a guide slot, or the shape of the element indicated by 11B, in the case of a "linear" solution.

Still with reference to FIG. 7, the control lever 2, whatever its configuration, has an elongated stem carrying the handle 2A at the top, and a lower end carrying a tip 2C of the type illustrated in FIG. 1B. In an intermediate portion thereof, the stem of the control lever 2 carries a thickened body 2G, which is received within a support 12. The support 12 is substantially a casing, with a perforated bottom wall, for passing the terminal part of the control lever 2, and four side walls defining a cavity in which the enlarged body 2G of the control lever 2 is received. Two coaxial articulation pins 13 project from two opposite walls of the support 12, for the pivoting assembly of the control lever 2 inside a support casing H (see, for example, FIG. 12) about a transverse axis 200.

With reference to FIG. 7, the support casing H consists of two casing elements H1, H2 rigidly connected to each other by means of screws 10. The two elements H1, H2 have two opposite main walls, parallel and spaced apart from each other, having coaxial holes 14 which receive the articulation pins 13.

Thanks to the arrangement described above, the control lever 2 is supported in a pivoting manner inside the casing H about the oscillation axis 200 (see also FIGS. 12-17).

Inside the casing H there is a pivoting body W (see, for example, FIG. 12) which, in the illustrated example (see FIG. 7), consists of two elements W1 and W2 rigidly connected together, having two main walls opposite and spaced apart, with holes 15 that are crossed by the articulation pins 13. The stem of the control lever 2 is immobilized in a seat 16 of the element W1 and held therein by the other element W2, so that the pivoting body W is connected in rotation with the control lever 2 with respect to the oscillation axis 200.

With reference again to FIG. 7, the element W1 forming part of the pivoting body W has a cylindrical wall portion, having an axis coinciding with the oscillation axis 200, wherein two openings 17 are formed, which are circumferentially spaced apart from each other, and which, in the example, are rectangular. One of these openings is chosen to receive an adapter element 18, which will be described in greater detail below, serving to connect a member 30 to the pivoting body W, for connecting one end of the metal cable (not illustrated) for actuating the gearbox. Still with reference to FIG. 7, two additional support plates Z1, Z2 are arranged outside the casing H, from which two arms 19 project in an overhanging manner that, in the assembled condition of the two elements Z1, Z2 on two sides of the casing, define a supporting and guiding structure for the sheath of the actuating cable. The elements Z1, Z2 also have holes 20 for engaging the articulation pins 13. Moreover, each of the elements Z1, Z2 has a circumferential series of holes 210 for engaging the fixing screws 10 that enable the elements Z1, Z2 to be mounted, and consequently the entire casing H, in different angular positions with respect to the container C, consisting of the two elements C1, C2.

In this way, the container C can be rigidly connected to the casing H by arranging the casing H in different angular positions about the axis 200 with respect to the container C.

FIGS. 8-11 show different possible arrangements of the control device according to the invention. FIGS. 8, 9 refer to the solution with a "linear" arrangement of the operating positions of the gearbox control lever in the case of mounting on a tunnel and mounting on a dashboard, respectively. FIGS. 10 and 11 show the arrangement with a shaped guide slot, respectively, in the version for mounting on a tunnel and for mounting on a dashboard.

Figures 1A, 1B:
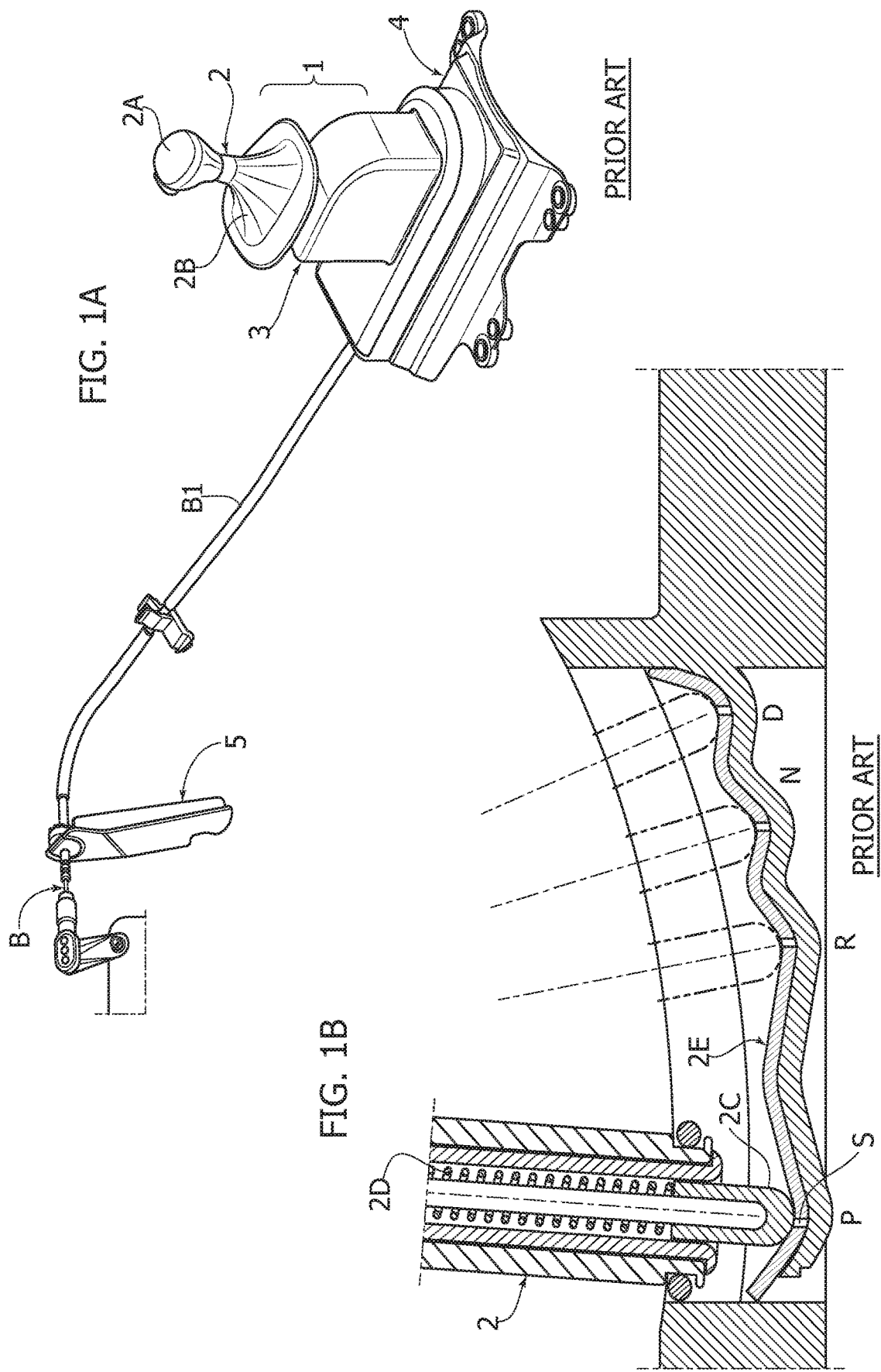
Figure 4:
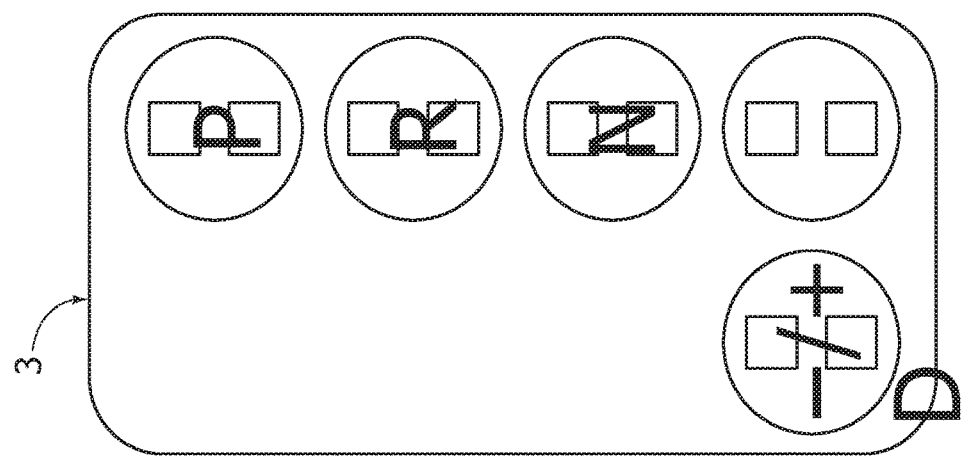
Figure 3:
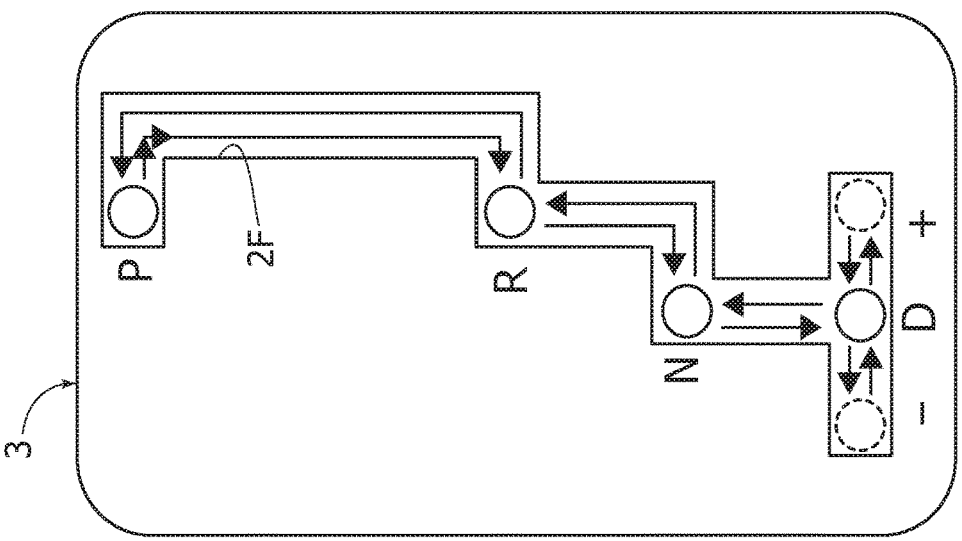
Figure 2:
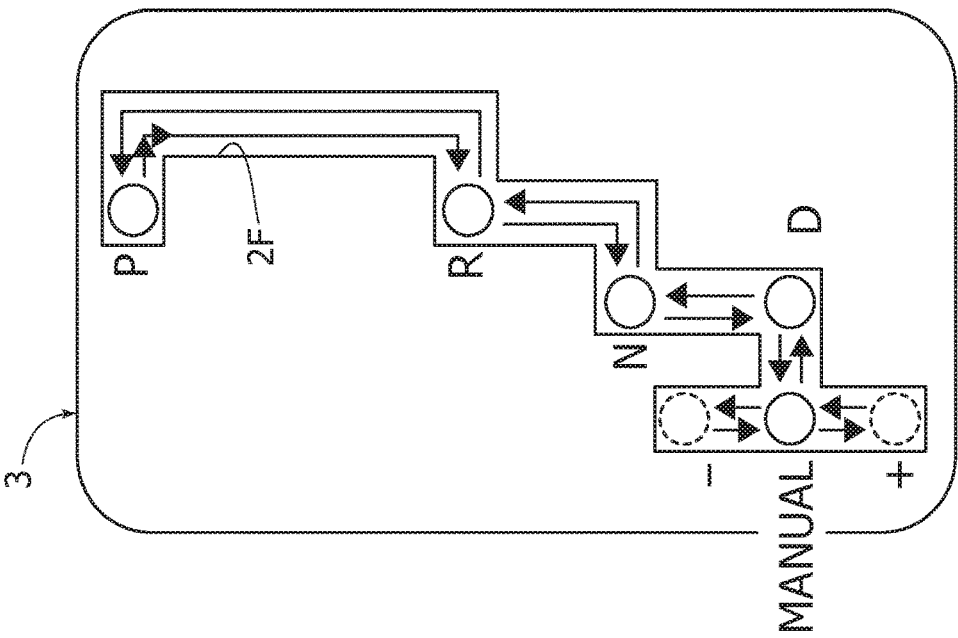
Figure 4B:
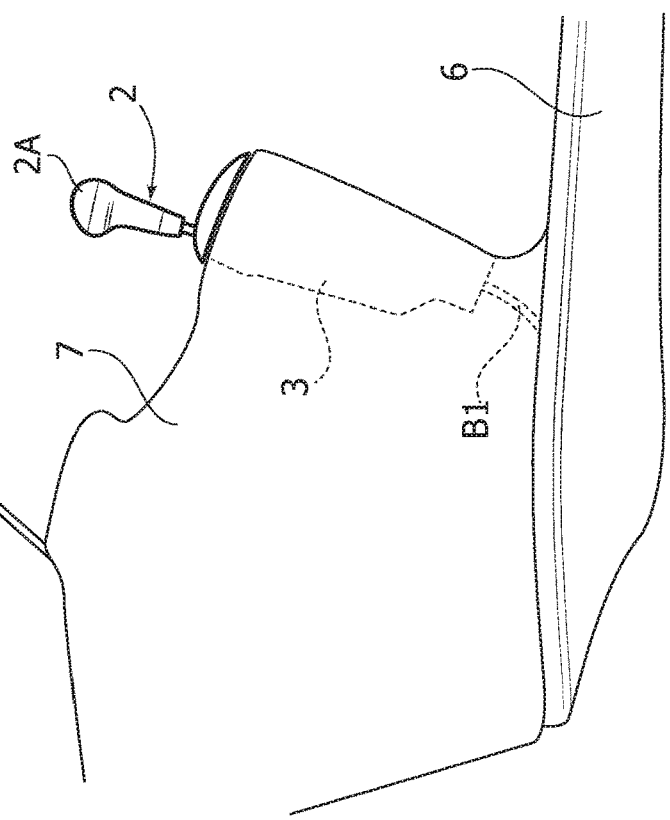
Figure 4A:
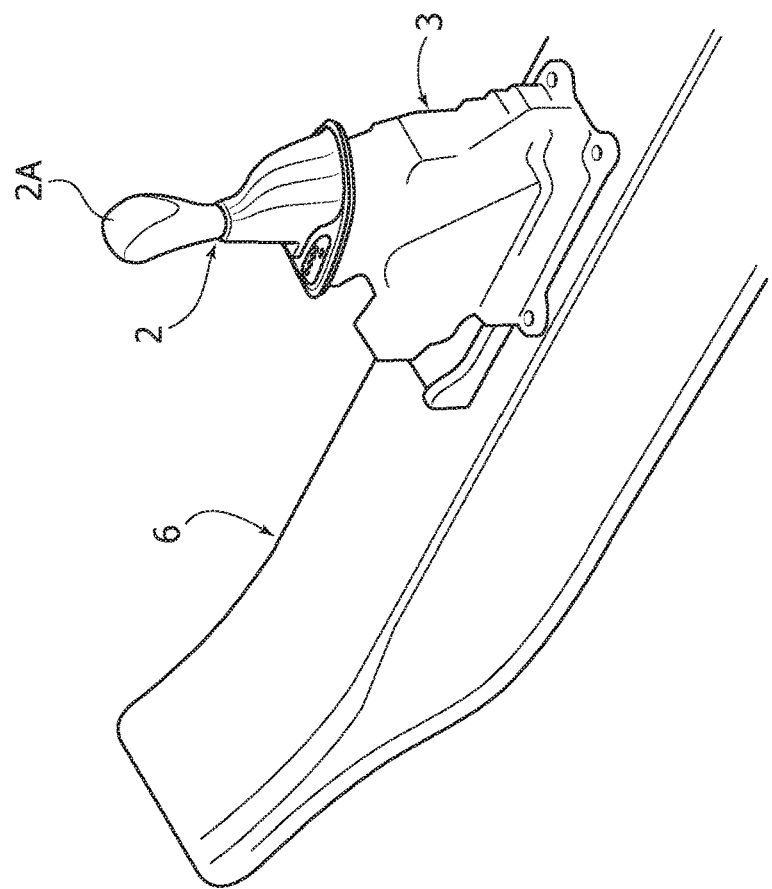
Figure 6:
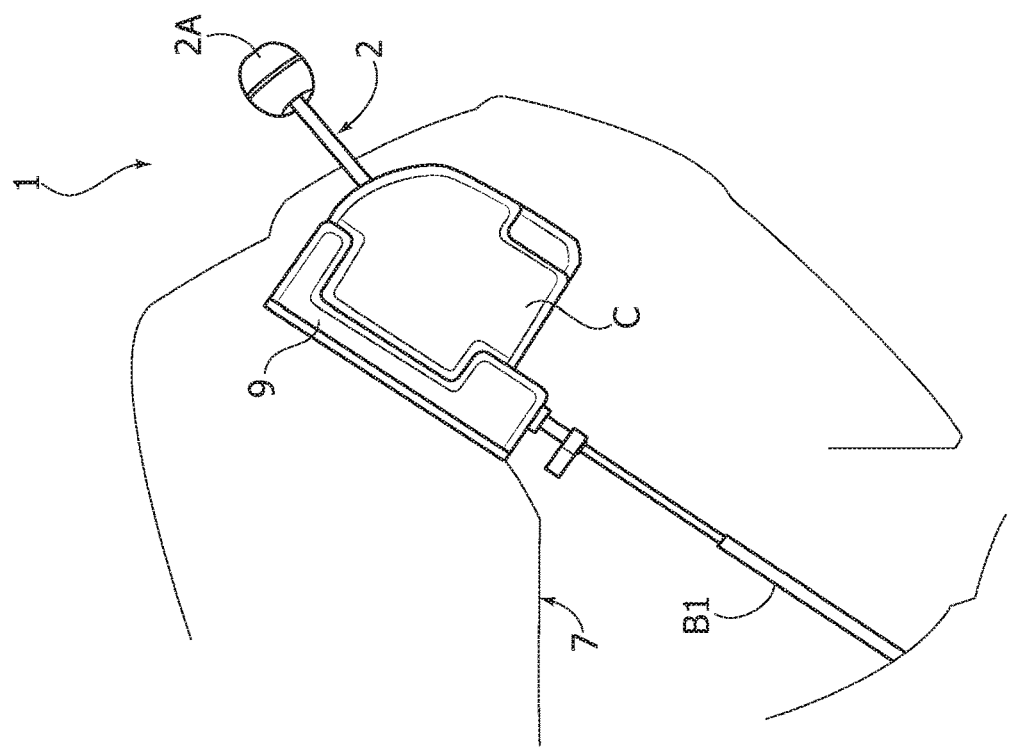
Figure 5:
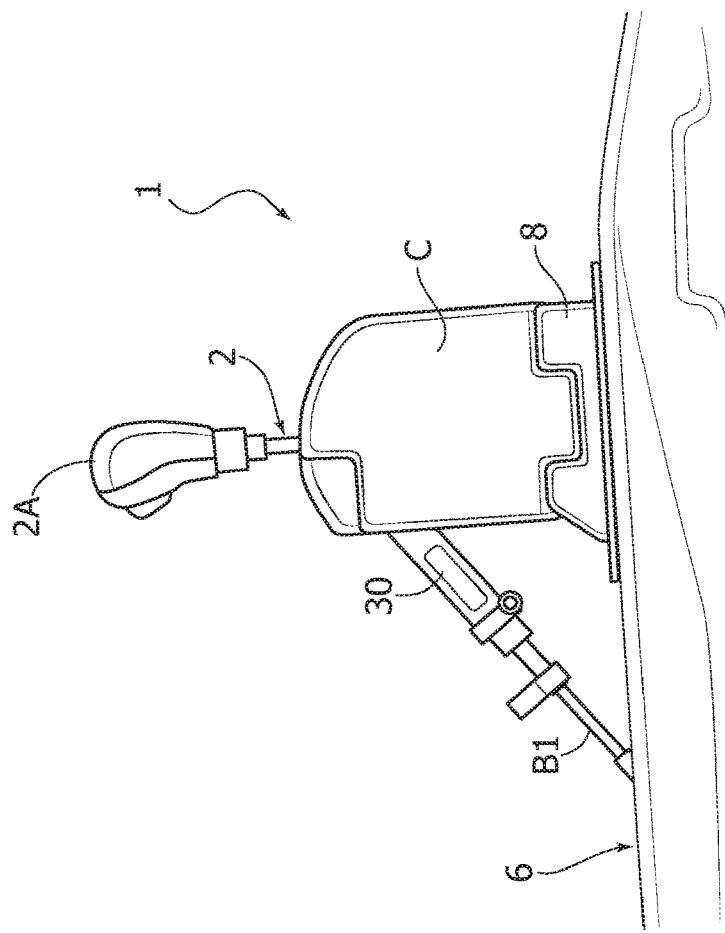
Figure 7:
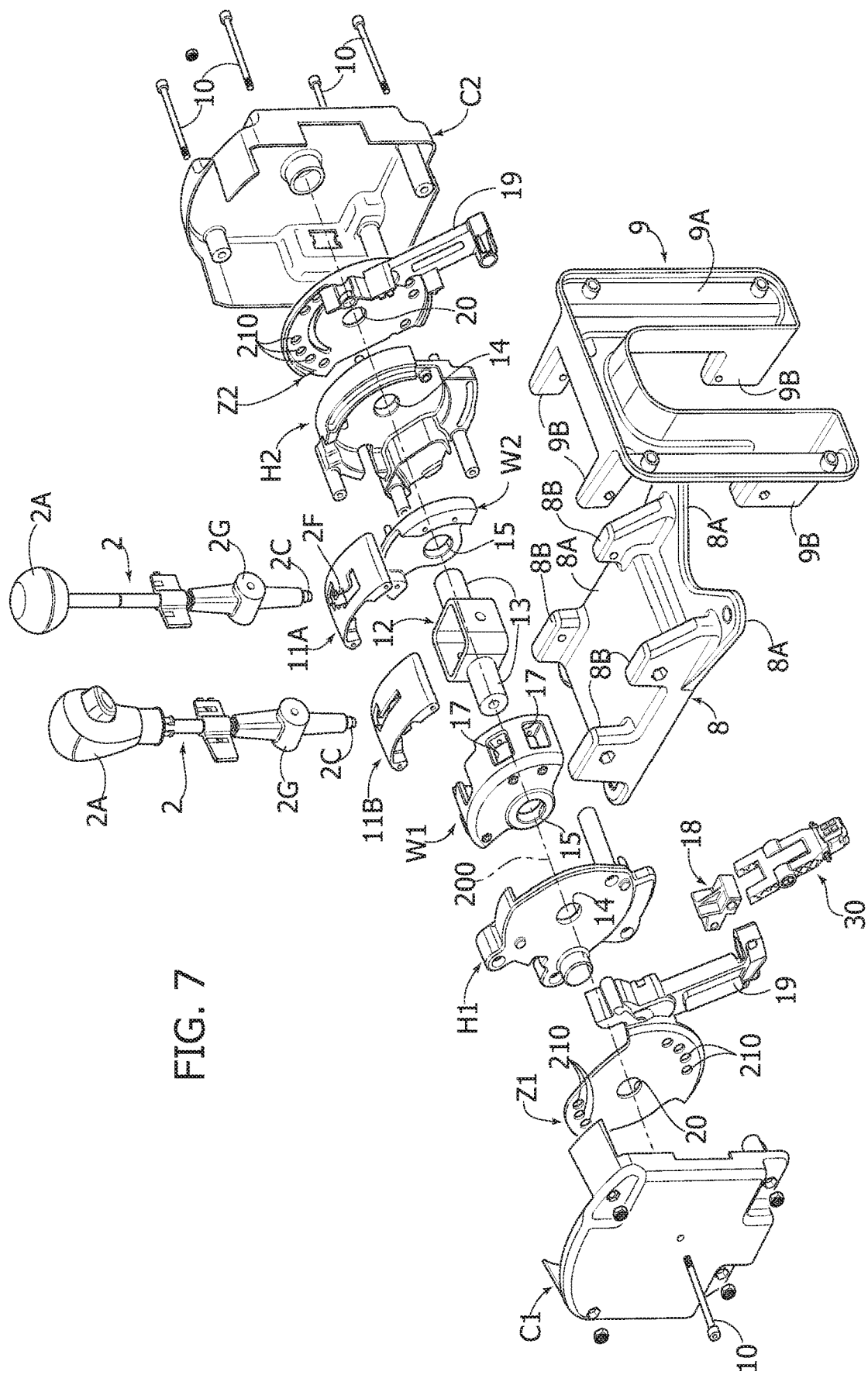
Figure 8:
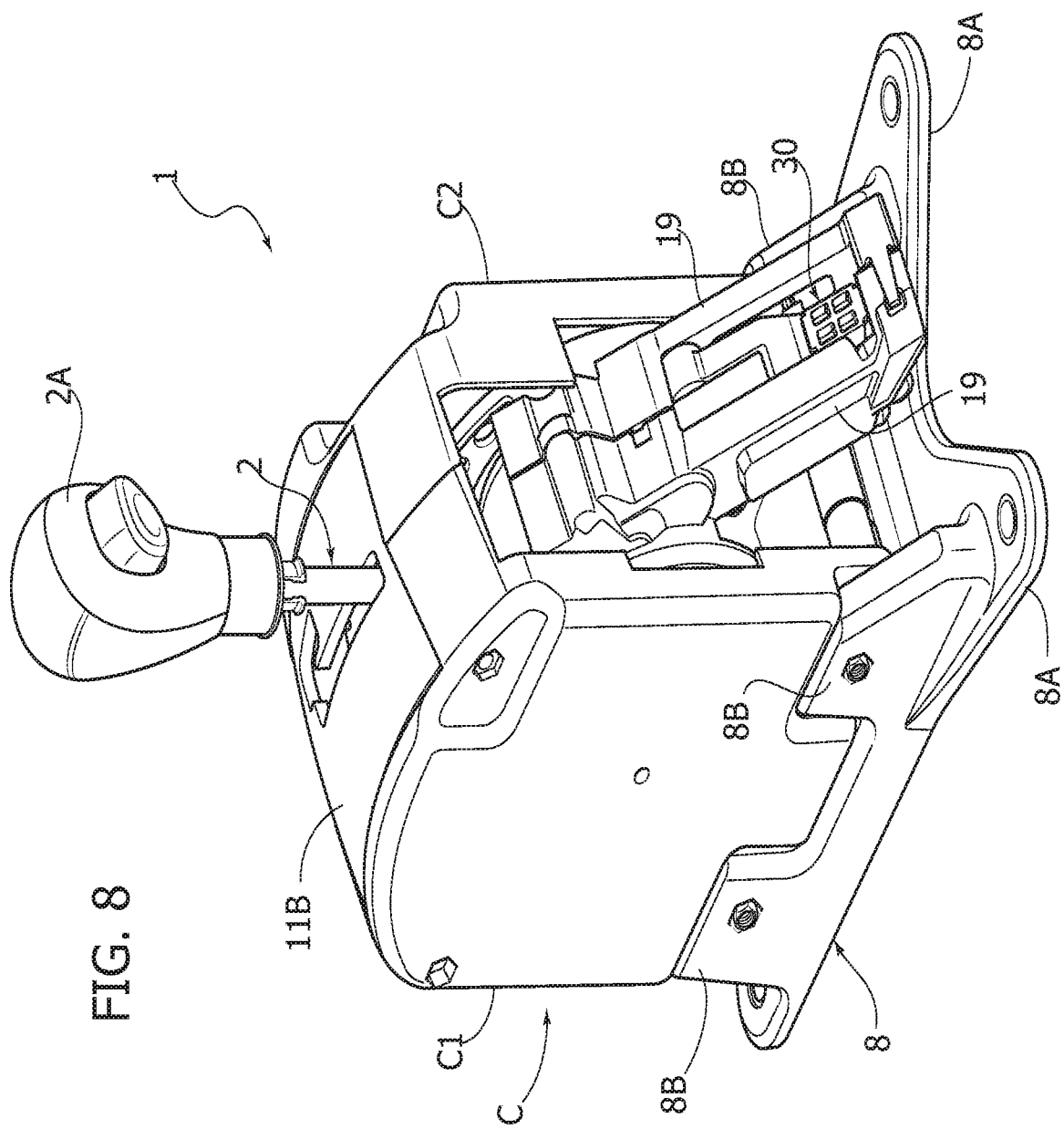
Figure 9:
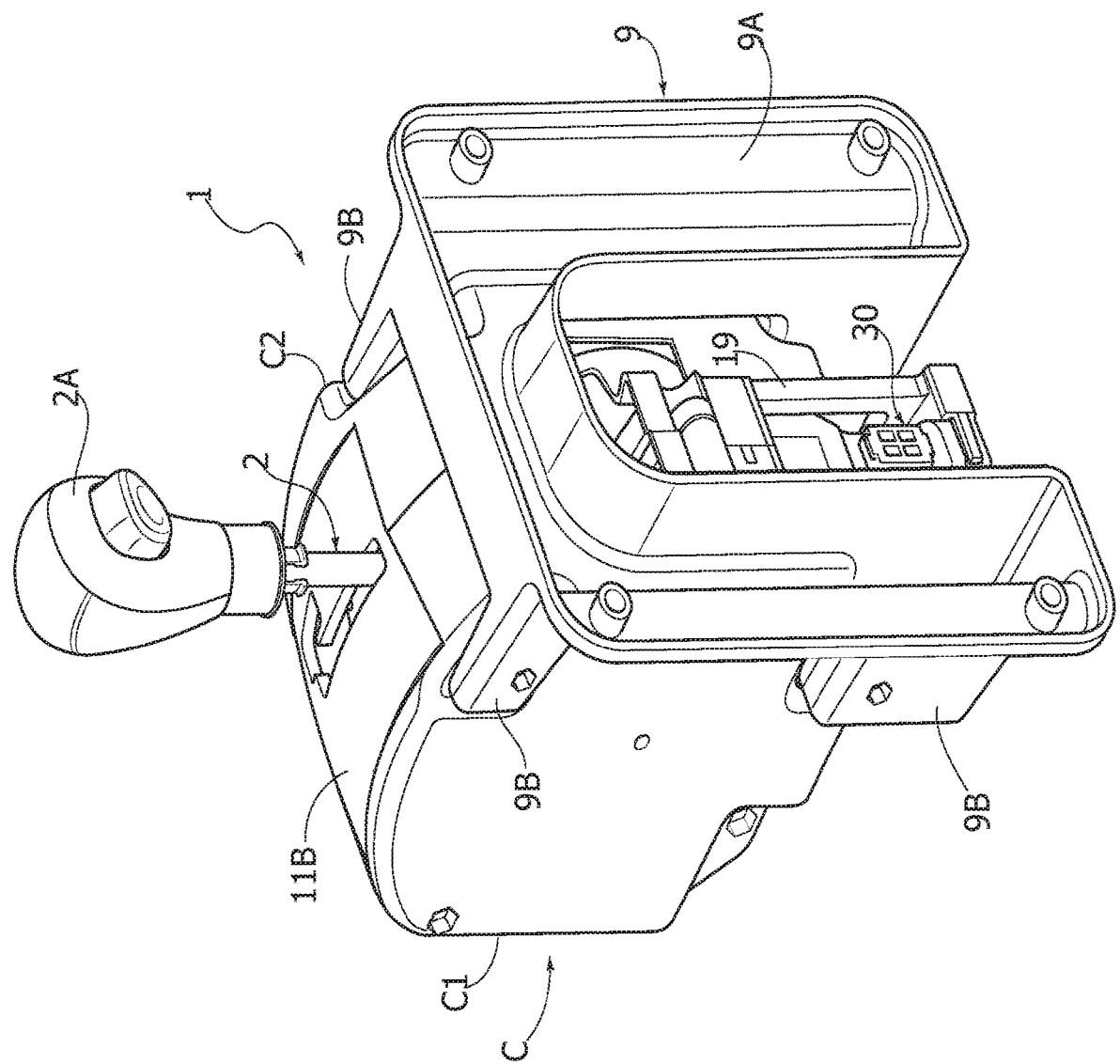
Figure 10:
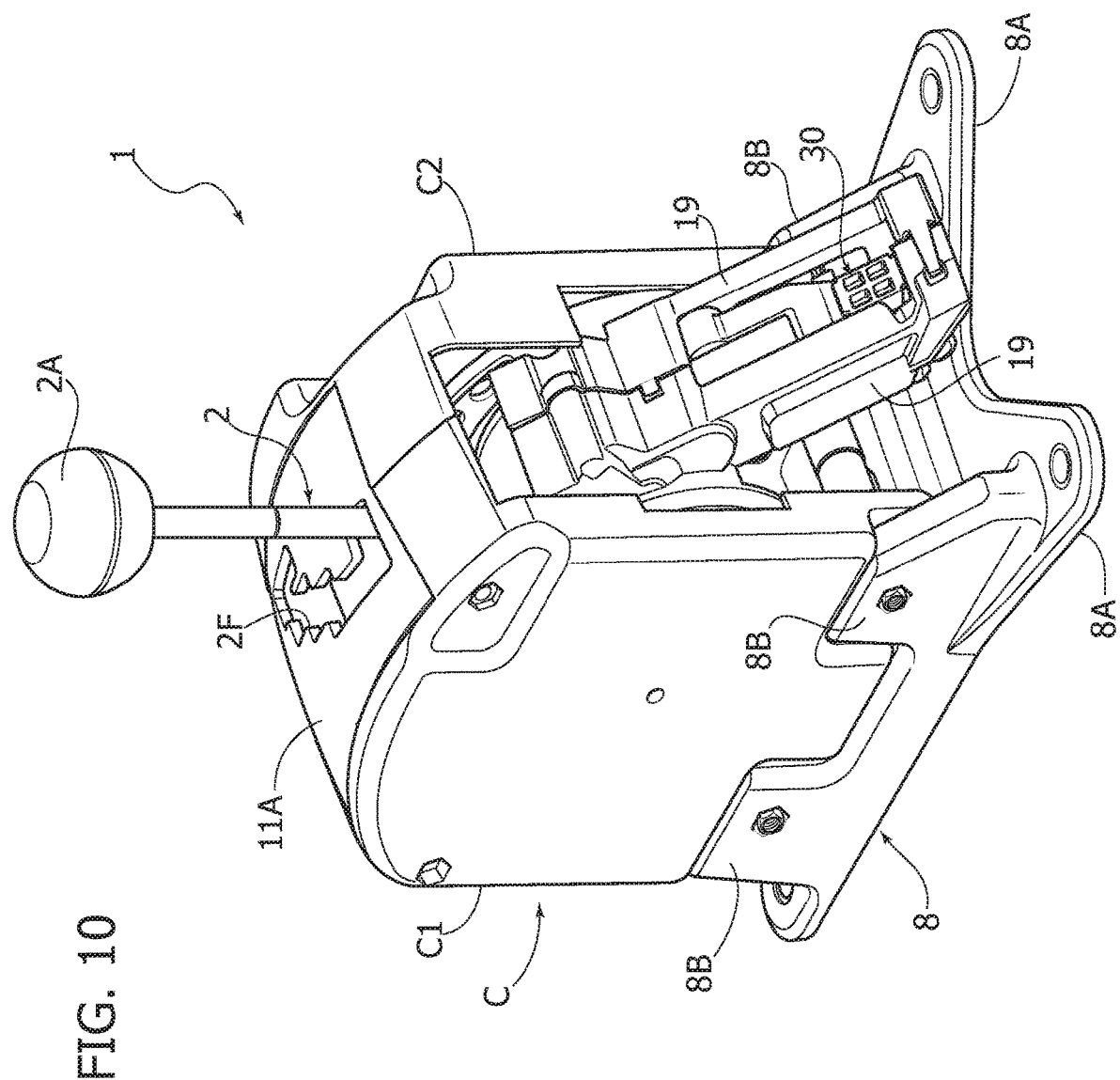
Figure 11:
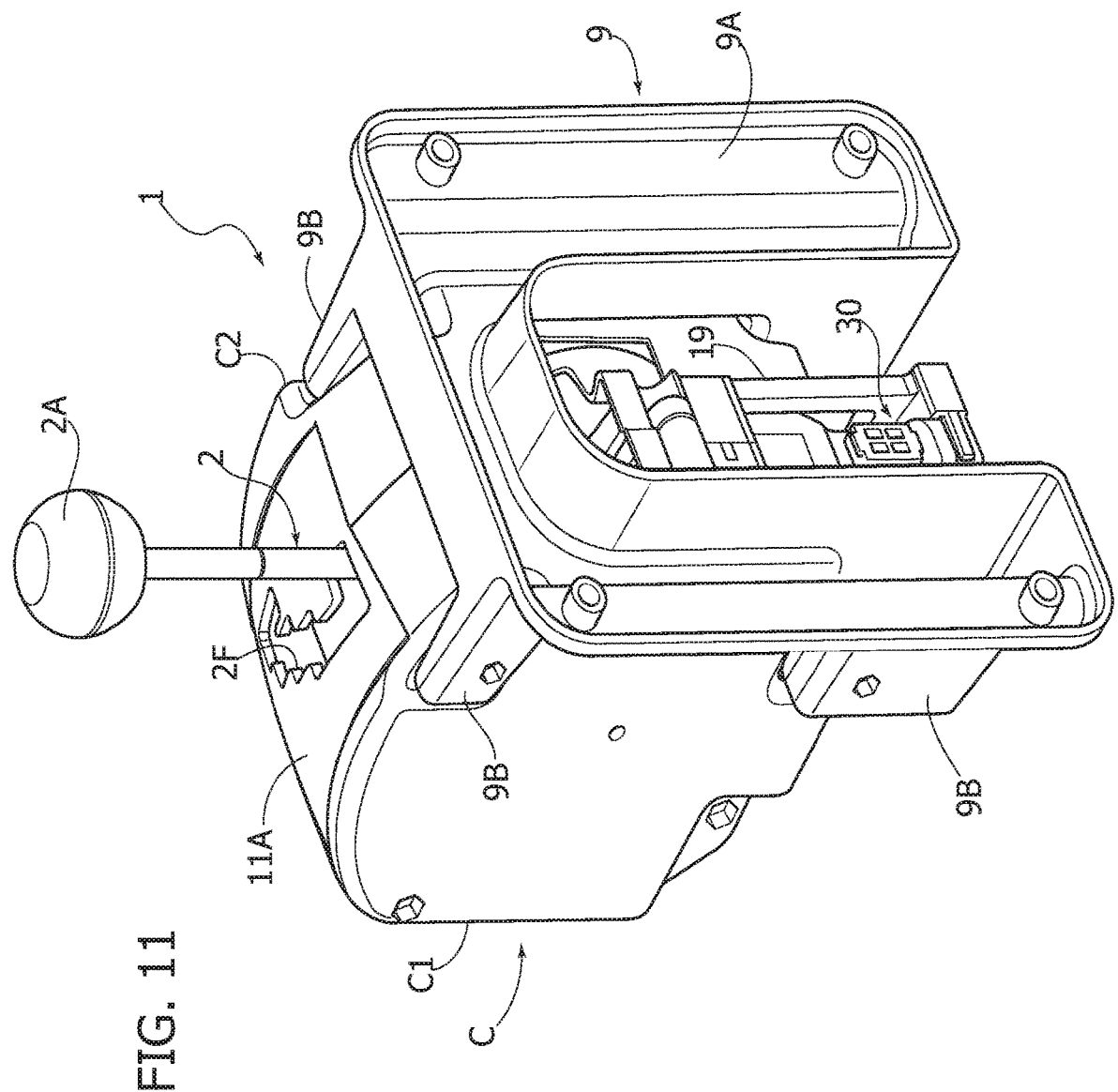
Figure 12:
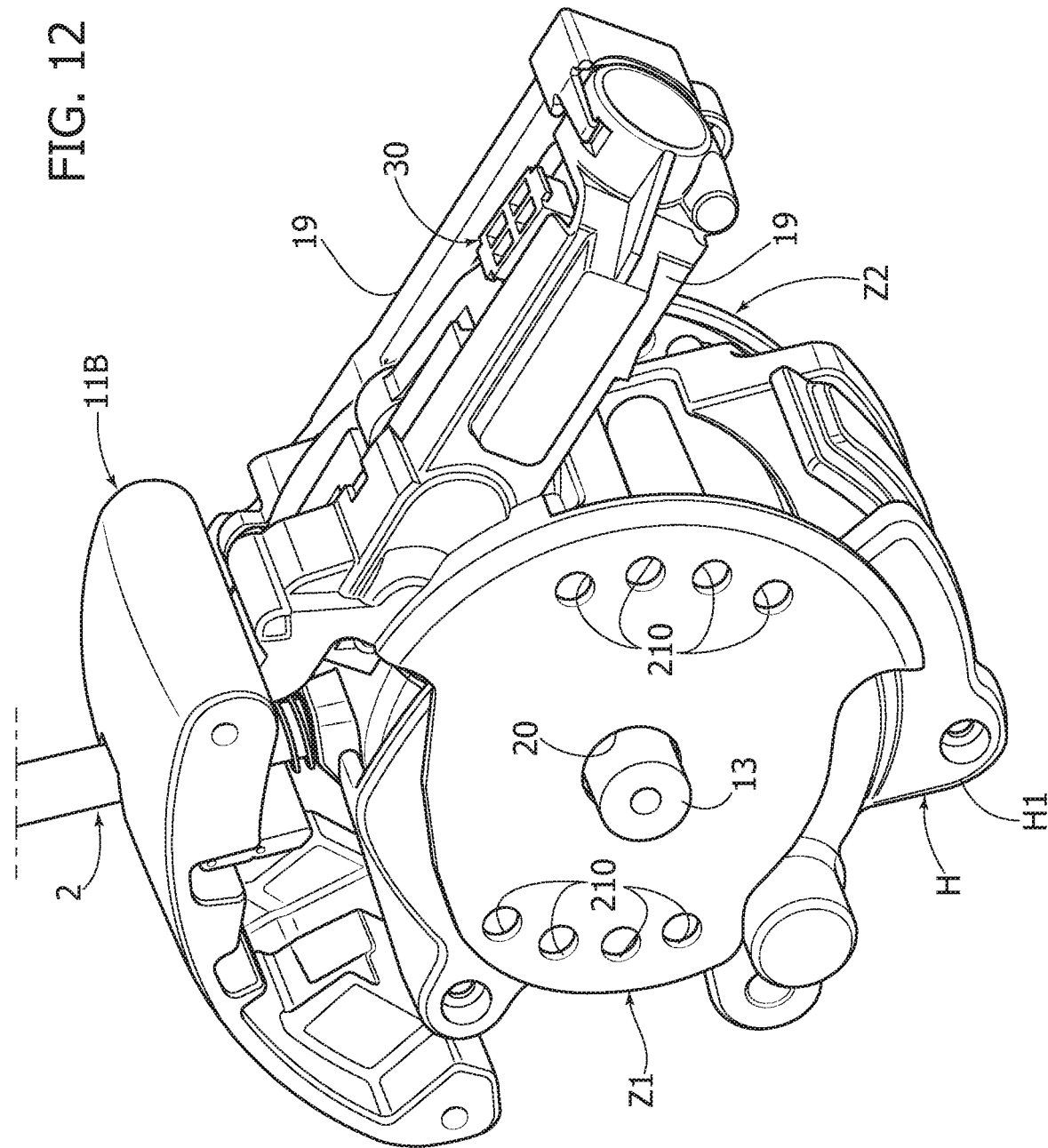
FIG. 12 shows, in the assembled condition, the control device according to the invention, with the elements C1, C2 defining the outer container removed for clarity.
Figure 13:
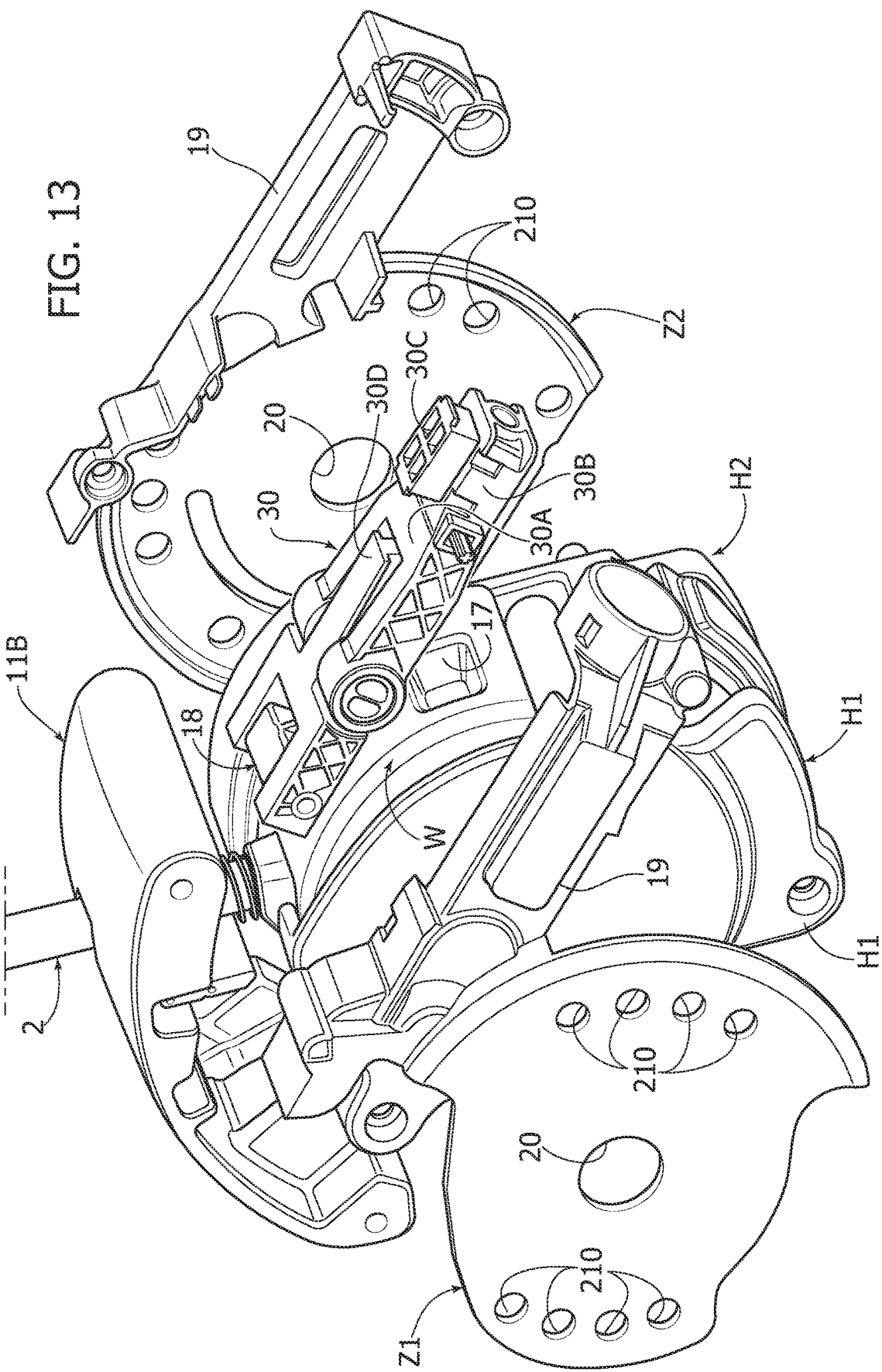
FIG. 13 shows the same assembly as in FIG. 12 in an exploded condition to show a member 30 serving to connect a metal actuating cable (not illustrated) to the adapter element 18 (better seen in FIG. 14, which is further exploded with respect to FIG. 13).
Figure 14:
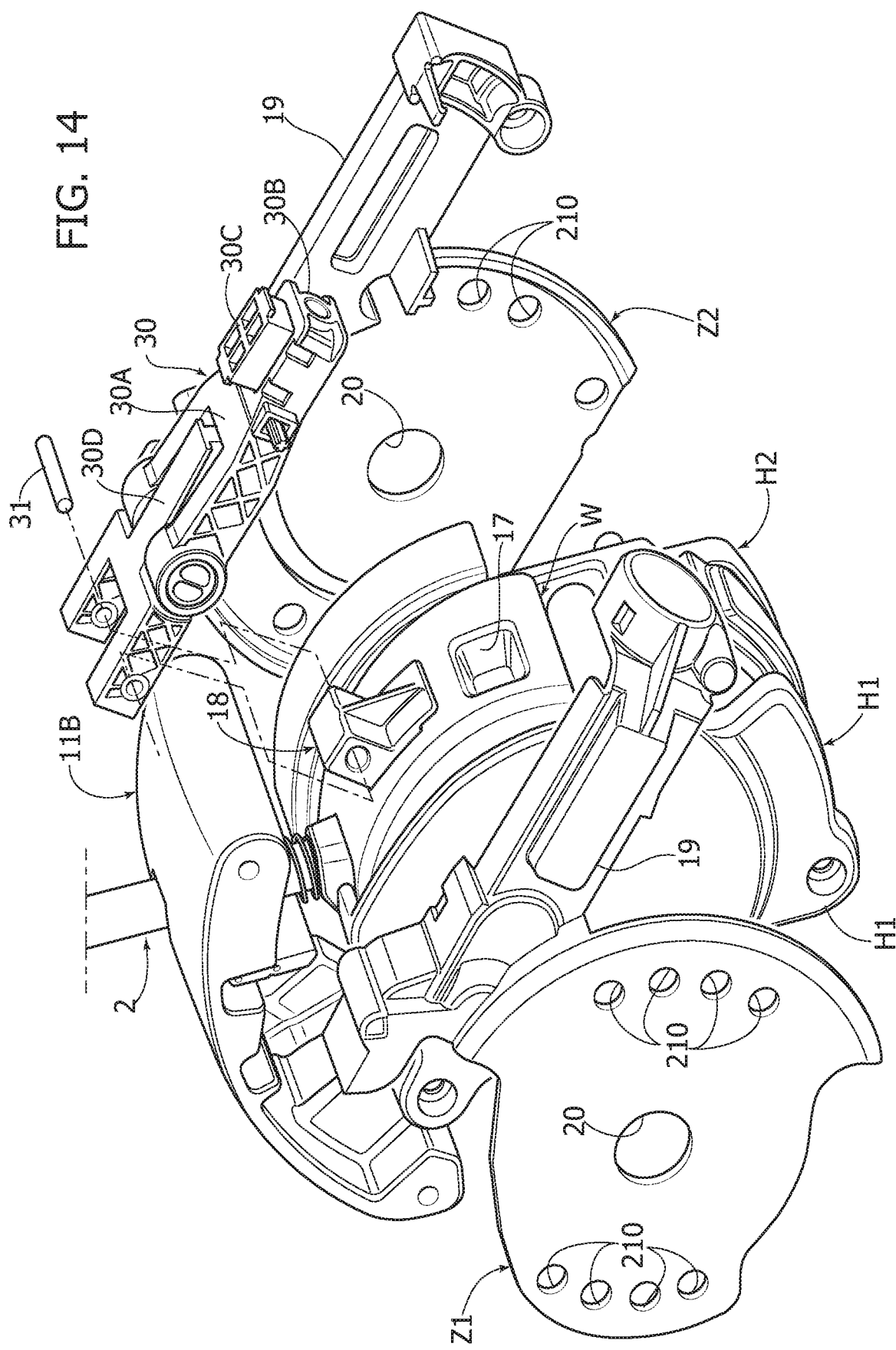

With reference to FIG. 14, the connecting member 30 is of a known type per se and comprises, in the illustrated example, a first fork element 30A having an end portion 30B intended to receive the end of the actuating cable (which is blocked by a blocking element 30C). The two branches of the fork portion 30A are used for the articulated connection of this element above the stem of another fork member 30D whose branches are connected in an articulated manner by means of an articulation pin 31 to an end portion of the adapter element 18.

Figure 15:
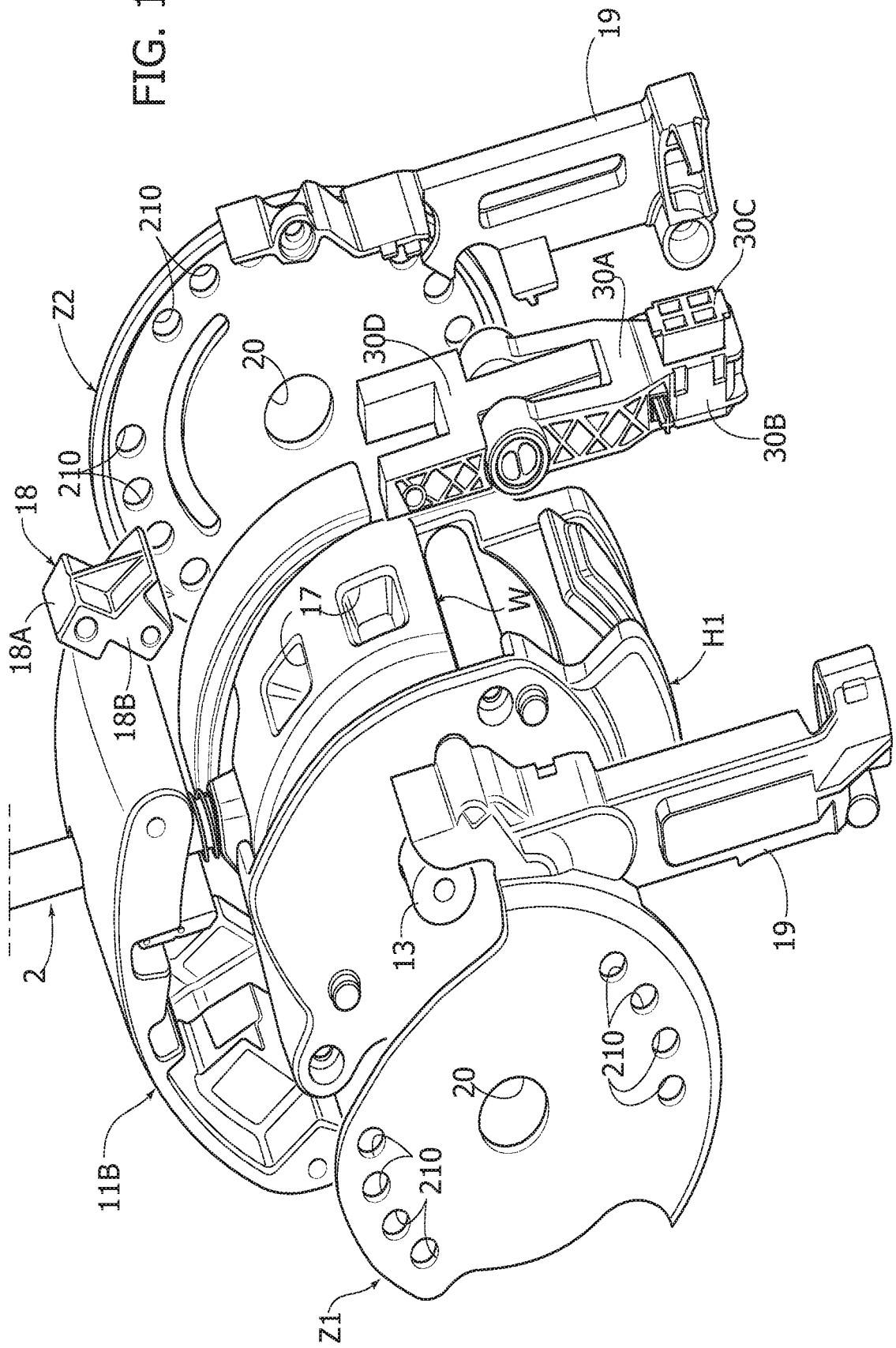

As clearly seen in FIG. 15, the adapter member 18 has a first end portion 18B that is prismatic in shape, which is received by interference in one of the seats 17 of the pivoting body W. The adapter member 18 also has a second end portion 18A, also prismatic in shape, to which the fork element 30B of the connecting member 30 is connected in an articulated manner, by means of the pin 31.

As can be seen in FIG. 15, the two end portions 18A, 18B of the adapter member 18 are offset transversely from each other relative to a longitudinal direction of the adapter member 18, which runs from one end portion to the other. This configuration of the adapter member 18 means that, using with the same components, a plurality of different positions and orientations of the connecting member 30 can be obtained with respect to the pivoting body W, in the condition of connection between these components.

In fact, the adapter element 18 can be inserted with its end portion 18B selectively in either of the two openings 17, which are circumferentially spaced apart, arranged on the cylindrical wall of the pivoting body W (of course, there can be any number of openings 17). Furthermore, once the same opening 17 has been selected for mounting the adapter element 18, the two end portions of the adapter element 18 can be reversed in position with each other, so that the end portion 18A is inserted in the opening 17, while the end portion 18B is used for the articulated connection of the connecting member 30. Due to the asymmetric configuration of the adapter element 18, with the two end portions offset transversely to each other, the aforesaid position reversal of the two end portions results in a different position of the connecting member 30 with respect to the pivoting body W.

Figure 16:
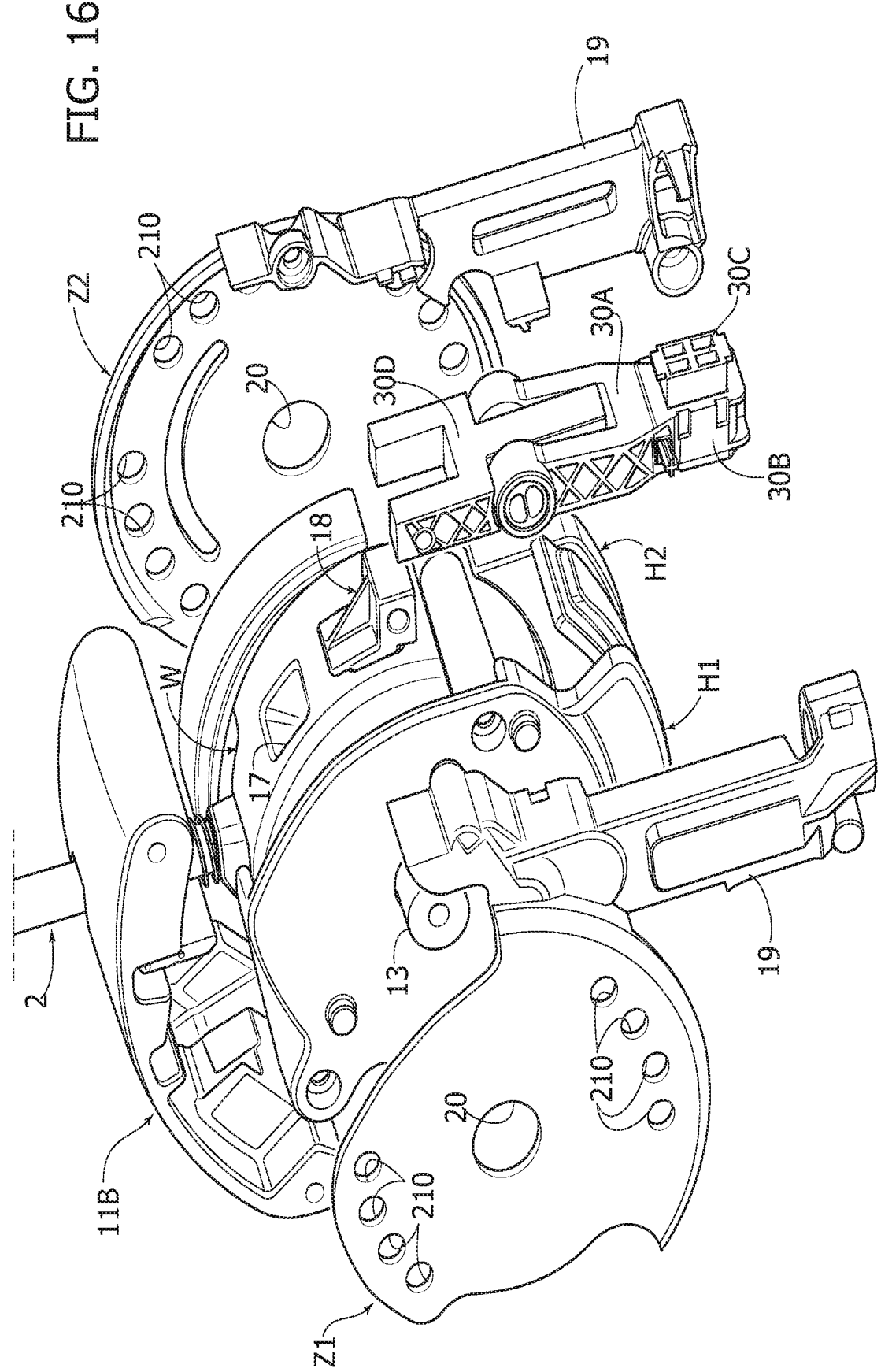
Figure 17:
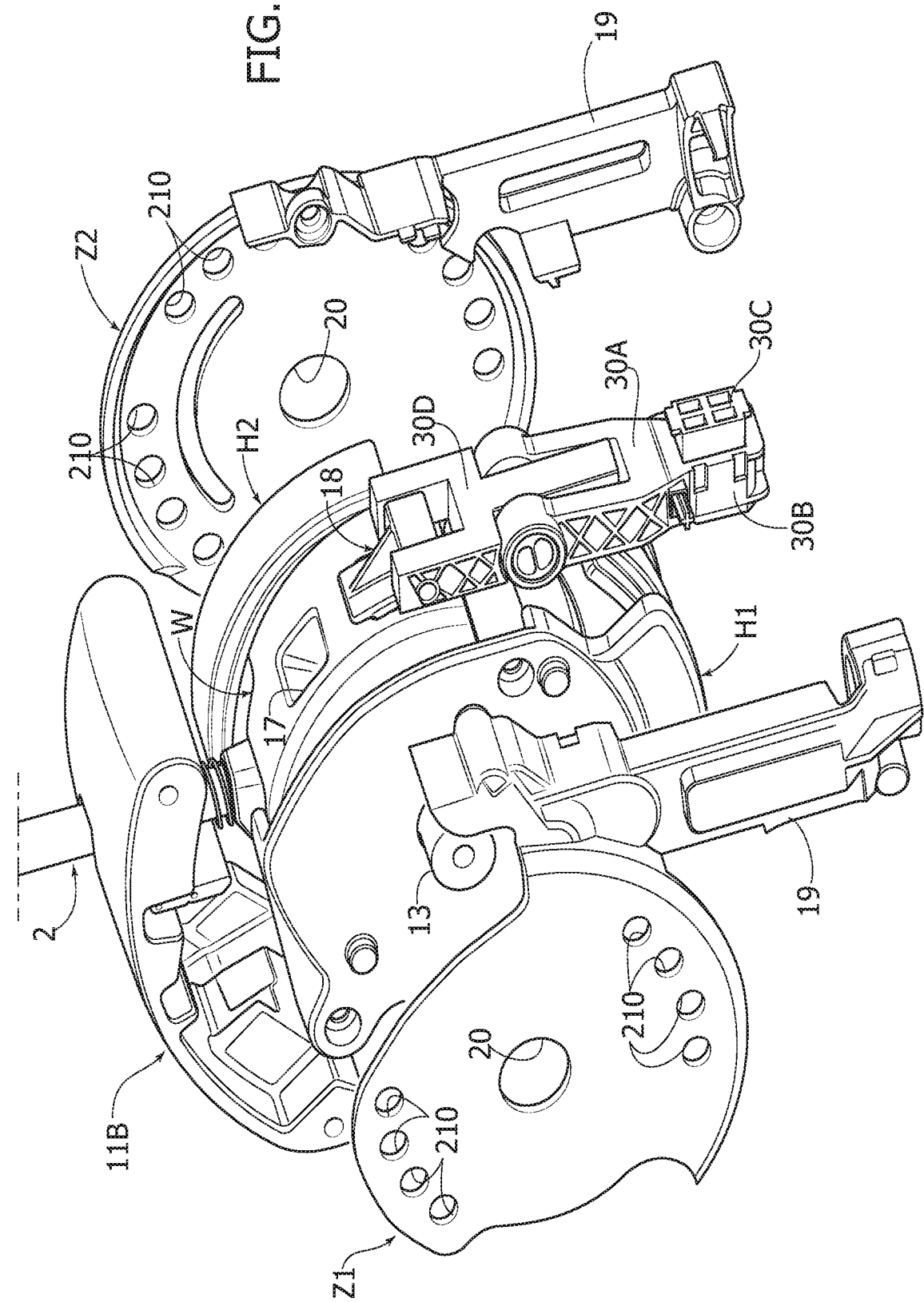
Figure 18:
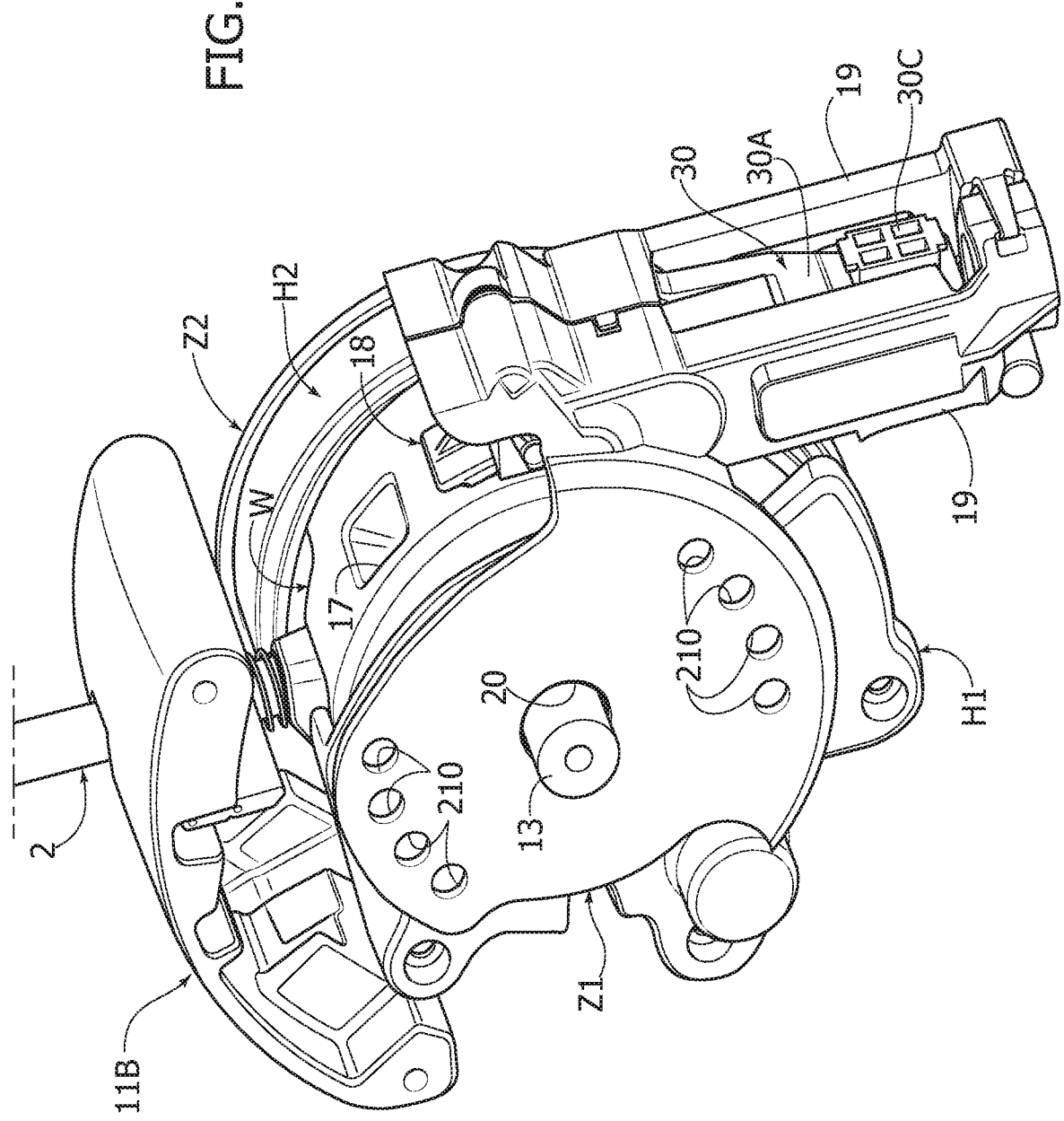

The sequence of FIGS. 16-18 shows how the unit can be assembled again with the adapter member 18 mounted in a different opening 17.

As stated, various positions and different orientations of the connecting member 30 (and consequently of the actuating cable), with respect to the pivoting body W, can be obtained by keeping the adapter element 18 mounted in the same opening 17, but reversing the position of the two end portions of the adapter element with each other.

Therefore, in the case of the illustrated example, which has two openings 17, the assembly can be mounted with four different positions and orientations of the connecting member 30 with respect to the pivoting body W.

The control device according to the invention therefore lends itself to be easily adapted to different assemblages on board the vehicle, easily enabling a variation of the position and the orientation of the actuating cable with respect to the pivoting body W, and also a variation of the angular position of the outer container C with respect to the inner casing H (thanks to the selective assembly of the fixing screws through just some of the holes forming part of the circumferential series of holes provided on the elements Z1, Z2).

Of course, the specific configuration of the adapter member 18 can vary with respect to that illustrated herein, since it is only essential that this element has an asymmetric configuration, with two end portions offset transversely from each other with respect to the longitudinal direction of the element. Likewise, the connecting means capable of allowing a variation of the angular position of the outer container C with respect to the inner casing H can vary widely, as will be apparent to those skilled in the art.

Of course, without prejudice to the principle of the invention, the details of construction and the embodiments may vary widely with respect to those described and illustrated purely, without departing from the scope of the present invention, as defined by the attached claims.

What is claimed is:

1. A control device for a vehicle gearbox, comprising:
   a support casing,
   a control lever pivotally mounted about an oscillation axis within said support casing and having an upper portion projecting from the support casing and carrying a lever handle,
   a pivoting body rotatably mounted within said support casing about said oscillation axis and connected in rotation with said control lever about said oscillation axis,
   a connecting member for connection of one end of a gearbox control cable, said connecting member being connected to said pivoting body,
   wherein said connecting member is connected to said pivoting body by least one adapter element,
   wherein said at least one adapter element and said pivoting body are configured so that they can be coupled with each other in different relative positions, so as to create different positions and/or different orientations of the control cable with respect to the pivoting body, and
   wherein said pivoting body has a cylindrical wall, or a cylindrical wall portion, having an axis substantially coincident with said oscillation axis and having a plurality of seats circumferentially spaced apart from each other and selectively engageable by said at least one adapter element for selectively connecting said at least one adapter element in different corresponding positions on said pivoting body.

2. The control device according to claim 1, wherein:
   said at least one adapter element has a body including:
   a first end portion configured to be received in a seat of the plurality of seats of the pivoting body, for connecting the at least one adapter element on the pivoting body, and
   a second end portion, configured to connect to said connecting member,
   said second end portion is configured to be reversed in position with said first end portion, so that said second end portion can instead be received in said seat of the pivoting body and said first end portion can instead be connected to said connecting member, and said first end portion and said second end portion of the at least one adapter element are offset relative to each other transversely to a longitudinal direction of said connecting element which goes from said first end portion to said second end portion, so that a relative position of the connecting member with respect to the pivoting body is different according to which of the first end portion and the second end portion of said at least one adapter element is engaged in said seat.

3. The control device according to claim 1, wherein the control device comprises a supporting container arranged on an outside of said support casing and rigidly connected thereto by a connecting arrangement configured to enable selective mounting of said support casing in different angular positions about said oscillation axis with respect to said supporting container.

4. The control device according to claim 3, wherein it the control device is provided both with a first mounting member configured to be rigidly connected to said supporting container and to be further connected to a longitudinal central tunnel-like portion of a vehicle floor panel, and with a second mounting member configured to be rigidly connected to said supporting container and to be further connected to a supporting structure for a vehicle dashboard.

5. A control device for a vehicle gearbox, comprising:
a support casing,
a control lever pivotally mounted about an oscillation axis within said support casing and having an upper portion projecting from the support casing and carrying a lever handle,
a pivoting body rotatably mounted within said support casing about said oscillation axis and connected in rotation with said control lever about said oscillation axis, and
a connecting member for connection of one end of a gearbox control cable, said connecting member being connected to said pivoting body,
wherein said connecting member is connected to said pivoting body by at least one adapter element,
wherein said at least one adapter element and said pivoting body are configured so that they can be coupled with each other in different relative positions, so as to create different positions and/or different orientations of the control cable with respect to the pivoting body,
wherein said at least one adapter element has a body including:
a first end portion configured to be received in a seat of the pivoting body, for connecting the at least one adapter element on the pivoting body, and
a second end portion, configured to be connected to said connecting member,
wherein said first end portion and said second end portion are configured to be reversed in position with each other, so that said second end portion can instead be received in said seat of the pivoting body and said first end portion can instead be connected to said connecting member, and
wherein said first end portion and said second end portion of the at least one adapter element are offset relative to each other transversely to a longitudinal direction of said connecting element which goes from said first end portion to said second end portion, so that a relative position of the connecting member with respect to the pivoting body is different according to which of the first end portion and the second end portion of said at least one adapter element is engaged in said seat.

6. A control device for a vehicle gearbox, comprising:
a support casing,
a control lever pivotally mounted about an oscillation axis within said support casing and having an upper portion projecting from the support casing and carrying a lever handle,
a pivoting body rotatably mounted within said support casing about said oscillation axis and connected in rotation with said control lever about said oscillation axis,
a connecting member for connection of one end of a gearbox control cable, said connecting member being connected to said pivoting body,
wherein said connecting member is connected to said pivoting body by at least one adapter element,
wherein said at least one adapter element and said pivoting body are configured so that they can be coupled with each other in different relative positions, so as to create different positions and/or different orientations of the control cable with respect to the pivoting body,
a supporting container arranged on an outside of said support casing and rigidly connected thereto by a connecting arrangement configured to enable selective mounting of said support casing in different angular positions about said oscillation axis with respect to said supporting container, and
wherein the control device is provided both with a first mounting member configured to be rigidly connected to said supporting container and to be further connected to a longitudinal central tunnel-like portion of a vehicle floor panel, and with a second mounting member configured to be rigidly connected to said supporting container and to be further connected to a supporting structure for a vehicle dashboard.

* * * * *